2,786,752
Patented Mar. 26, 1957

United States Patent Office

2,786,752

RECOVERY OF PLATINUM FROM ALUMINA BASE PLATINUM CATALYST

Herbert R. Appell, North Riverside, Ill., assignor to Universal Oil Products Company, Des Plaines, Ill., a corporation of Delaware No Drawing. Application January 13, 1954,
Serial No. 403,904

11 Claims. (Cl. 75—121)

This invention relates to an improved method for recovering a noble metal from composites containing platinum and more specifically to an improved method for recovering platinum from catalysts having platinum associated with refractory compounds, such as alumina, magnesia, zinc oxide, silica, etc., as well as from catalyst having platinum associated with two or more of these refractory compounds, such as alumina-magnesia, alumina-silica, etc., these catalysts having been prepared for use in chemical or hydrocarbon conversion processes.

There are various types of platinum-containing catalysts which are produced by compounding or supporting the platinum with at least one other compound. These catalysts are generally manufactured in a powdered or pelleted form suitable for use in a processing reaction chamber or tubular reaction zone where the catalyst is contacted with a hydrocarbon reactant stream to effect a conversion such as hydrogenation, cyclization, hydrocracking, or like operations for which the particular platinum catalyst has been found particularly valuable. In such contacting operations, the usual catalytic material is essentially deactivated or contaminated with a carbonaceous material so that it must be regenerated or replaced in the catalyst-containing chamber. Regenerating procedures usually comprise an oxidation or burning operation which will effect the removal of the contaminating matter from the catalyst. However, even though regeneration is employed to prolong the useful life of the catalyst, it is generally found that all or a part of the catalyst must eventually be discarded and replaced with freshly manufactured material.

It is a principal object of the present invention to provide improved means for recovering the valuable platinum from a catalyst, particularly where the material comprises a refractory metal oxide supporting platinum as the activating component or as a part of the activating component.

In one embodiment the present invention relates to a method of recovering a noble metal from a noble metal-containing composite which comprises reacting said composite with a reagent comprising an acidic component having an oxidizing activity less than that of nitric acid and an oxidizing agent in addition to said acidic component and separating said noble metal therefrom.

In another embodiment the present invention relates to a method of recovering platinum from a composite containing platinum, refractory metal oxide and inert metal sulfide which comprises reacting said composite with a reagent comprising an acid having an oxidizing activity less than that of nitric acid and an oxidizing agent in addition to said acid, thereby forming a soluble compound of said oxide and a soluble compound of said inert sulfide and separating platinum therefrom.

In a specific embodiment the present invention relates to a method of recovering platinum from a composite containing platinum, alumina, and chromium sulfide which comprises reacting said composite with a reagent comprising sulfuric acid and perchloric acid, thereby forming aluminum sulfate and chromium sulfate and separating platinum from a solution of the sulfates.

When used in the contacting operation, the catalyst also picks up, has deposited thereon, or is mixed with other materials besides the heavy hydrocarbonaceous material or coke. These other materials often affect the activity of the catalyst and may mask or counteract the effect of the noble metal in the desired catalytic reactions.

When the noble metal is to be reclaimed from the composite or catalyst, for many industrial applications it is desirable to remove impurities from the precious metal, and this is especially true when the noble metal is to be used as a component of a catalyst since these noble metals are used in catalysts in exceedingly low percentages. In a recently developed catalyst that is used in the reforming of gasoline, the percentage of platinum on an alumina base carrier may vary from about 0.01% to about 1% by weight of the final catalyst. Due to these exceedingly low percentages of noble metal, it is important that the noble metal be free from or contain only very small percentages of impurities, since, as is hereinbefore mentioned, the presence of these impurities is often objectionable and may mask or counteract the effect of the noble metal in the desired catalytic reaction.

While the process of my invention is particularly adaptable to the recovery of platinum from platinum-containing catalysts or other composites, it may also be used for the recovery of other noble metals including iridium, osmium, palladium, rhodium, ruthenium, silver and/or gold.

The impurities that are particularly difficult to separate from the precious metal are materials or metals which form inert sulfides. When used in hydrocarbon conversion processes various metals or compounds thereof are picked up or deposited on the catalyst. The catalyst may also become mixed with these impurities forming a mixture of catalyst and impurities. When a platinum-containing catalyst is used in a reaction zone, the catalyst may come into contact with inert metal sulfide dust which may come from the processing equipment or the reaction zone itself, and when the catalyst is removed from the reaction zone, the inert metal sulfides are also removed. The inert metal sulfides usually are present as dust or fine particles which are mixed with the catalyst particles. In addition to this, the inert metal sulfides may also be picked up by the catalyst during the conversion process. These metal components may be present originally in the hydrocarbon charge or may be picked up by the hydrocarbon charge stream in passing through the process equipment such as fractionators, heat exchangers, heaters, etc. In most hydrocarbon conversion processes, especially as practiced in the petroleum industry, there is present in the charge stock a certain amount of sulfur, either as free or as combined sulfur or both. The metal contaminants or impurities that the catalyst picks up or is mixed with react with this sulfur and the metal impurities, therefore, are present with the catalyst as sulfides. Reference made to a catalyst or a catalytic composite or mixture in the present specification and claims includes mixtures of catalyst and inert metal sulfides, as the mixture is usually obtained when the catalyst is removed from the reaction chamber.

The sulfides of the metal impurities are usually termed inert metal sulfides, that is, they do not react with ordinary reagents, for example, acids such as hydrochloric, sulfuric, etc. These inert metal sulfides, however, may be oxidized to the sulfate, and the sulfates are usually water soluble. These metal sulfides are also dissolved in aqua regia, as are the noble metals. When a mixture of a noble metal and these inert metal sulfides is contacted with aqua regia both the noble metal and the other metal dissolve so that this method cannot be used for separating the two.

The inert metal sulfides that are frequently found in catalyst composites and which may be separated from the platinum in the platinum recovery method of this invention are the sulfides of iron, chromium, molybdenum, nickel, tungsten, cobalt, etc. Sulfides of one or more of these metals may be removed by the process of my invention, and the invention is preferably used on composites containing chromium sulfide itself or in combination with the sulfides of one or more of the aforementioned metals.

A noble metal that is present in a composite with a refractory inorganic oxide and at least one of the inert metal sulfides is recovered in accordance with the invention by treating or reacting the composite with an acidic component.

The acidic component comprises an acidic compound or acid such as the strong mineral acids, sulfuric acid, hydrochloric acid, hydrofluoric acid, chlorosulfonic acid, fluorosulfonic acid, and the like which are capable of reacting with or dissolving the inorganic oxide base and forming a soluble compound thereof. Preferably sulfuric acid is employed in the operation. Nitric acid is not suitable since it partly dissolves or aids in dissolving the noble metal or noble metal compound. The exact reason for this is unknown, however, it appears that many catalytic composites, before or after use, contain a small amount of chlorine, and the oxidizing power or activity of the nitric acid along with the other reactions of nitric acid tend to convert this chlorine into a form such that the solution acts as aqua regia which dissolves some of the noble metal. The noble metal that dissolves with the inorganic oxide must, therefore, be separately recovered which requires an additional step. It is, therefore, preferred that the acid used does not dissolve any of the noble metal, and for this reason nitric acid should not be used. Other acids having an oxidizing power or oxidizing activity equal or greater than nitric acid, when comparing equal molar concentrations, should not be used for this and similar reasons. I do not, however, intend my invention to be limited to the above theory of why certain oxidizing acids should not be used since the stronger oxidizing acids may contribute in other ways to dissolve the noble metal. The preferred acids to use in accordance with my invention, therefore, are those which have an oxidizing capacity or oxidizing activity less than that of nitric acid, and sulfuric acid is a specifically preferred acid.

Where hydrochloric acid is employed as the reagent, it is preferably used in a solution of about 5 to about 25% HCl with heat being subsequently applied and water added to permit dissolving substantially all of the soluble compound that is formed from the base material. Concentrated HCl of about 37% HCl may be used with additional water being added to dissolve the aluminum chloride that is formed.

In a preferred operation sulfuric acid is employed to dissolve the metallic oxide base with approximately 40% acid solution being desirable to effectively dissolve the alumina. However, sulfuric acid solutions ranging from amount 25% to about 60% sulfuric acid can be used.

The composite may be in a finely divided, ground or powdered state, or in a pill form, for the present recovery procedure is not dependent upon the form of the catalyst material. Catalyst fines which are obtained by screening catalyst particles removed from a reaction zone are also suitable for use in the present recovery process, and these fines usually have a high concentration of these inert metal sulfides. However, where the material is in a ground or powdered state, the reaction with the acid is generally violent and heat producing and should be maintained under control. The heat of reaction is desirable to aid in dissolving the metal oxide base, and as the reaction continues, additional heat may be supplied to the mixture with additional water being added to completely dissolve the resulting soluble compounds as the reaction is completed. The liquid may be decanted off and more acid added to the remaining catalyst with heat and water being added to effect further dissolving of the metal oxide. The second or successive batches of solution may be added to the decanted solution, and the entire mixture heated to a boiling state.

When the procedure of acid digestion, as is described above, is used, however, inert metal sulfides are not dissolved and these sulfides remain as solids with the platinum. It is difficult to remove the sulfides from the platinum by a subsequent treatment of the mixture. Using the method of my invention platinum is recovered relatively free of these inert metal sulfide impurities.

In accordance with my invention an oxidizing agent is added to the acidic component, and this mixture is used as a reagent which is reacted with the catalyst composite or mixture, that is the catalyst with the inert metal sulfides. The oxidizing agent may be added to the noble metal-inert metal sulfide mixture just prior to adding the acid to the mixture and/or the oxidizing agent may be added to the acid before contacting with the mixture. It is preferred, however, that the oxidizing agent be added after the acid is commingled with the catalyst since best results have been obtained when using this procedure. When the oxidizing agent is added early in the digestion step, that is the digesting of the inorganic oxide with an acid, it appears that the oxidizing agent first attacks the reactive sulfides so that as a result the oxidizing agent is used almost entirely to oxidize the more reactive sulfides to sulfates. When using sulfuric acid, this acid has some oxidizing capacity and will oxidize the reactive sulfides such as ferrous sulfide to ferrous sulfate, etc. When an oxidizing agent is added as the reagent to react with the catalyst composite, it appears that the oxidizing agent first oxidizes the reactive metal sulfides, while the sulfuric acid could be used to oxidize these. Best use of the oxidizing agent is, therefore, made when the oxidizing agent is added after the acid has reacted to some extent with the inorganic oxide part of the catalyst composite, and in this time it appears that the acid, such as sulfuric, oxidizes the more readily oxidized metal sulfides, and consequently, the oxidizing agent is available to oxidize the inert metal sulfides, for example, to oxidize chromium sulfide to chromium sulfate. The oxidizing agent is added before there is substantial reaction of the acid with the alumina. The oxidizing agent is preferably added before 50% of the inorganic refractory oxide has reacted and preferably after contacting the composite with the acid for a period of time usually after at least one minute of contact of the acid with the catalytic composite, however, as hereinbefore mentioned, the oxidizing agent may be added with the acid, although it is preferred to add it later.

The oxidizing agent that is used may be a solid, liquid, solution and/or gas. The preferred oxidizing agents comprise either the dry oxidizing agents or solutions of the oxidizing agents. The preferred oxidizing agents are water soluble and are used as water solutions; that is an aqueous solution of the oxidizing agent is added to the acid in a preferred embodiment of this invention. Specifically preferred oxidizing agents comprise the following compounds as well as their solutions: perchloric acid, hypochlorous acid, chloric acid, hydrogen peroxide, potassium persulfate, sodium persulfate, potassium dichromate, sodium dichromate, potassium permanganate, sodium permanganate, etc. Nitric acid and other nitrates or nitrites are not suitable for use in the present invention since, as hereinbefore discussed in detail, they often will cause the platinum to dissolve, that is, they tend to cause the platinum to go into solution. Air is a suitable gaseous oxidizing agent as are other free oxygen containing gases such as for example: oxygen, flue gases, oxygen enriched flue gases, oxygen enriched air, etc. Air contains nitrogen, however, this nitrogen is free nitrogen, that is, it is not in chemical combination with other elements as in a nitrate. This free nitrogen does not appear to tend to cause the platinum to go into solution. The preferred oxidizing agents, therefore, comprise those oxidizing agents which are substantially free of combined nitrogen.

The amount of the oxidizing agent to be used depends upon the particular oxidizing capacity of the compound as well as the degree or amount of oxidizing that is to be performed. Generally, from about 0.02% to about 10.0% by weight based on the solids charged to the process is a sufficient amount of oxidizing agent to add to the acid or to the solids before adding the acid and preferably from about 0.02% to about 3.0% by weight of oxidizing agent. Lesser quantities do not have sufficient oxidizing ability and greater amounts than specified above are usually in excess and are not of advantage to use.

After the composite or mixture of the inorganic refractory oxide, the platinum and the inert metal sulfide is reacted with the mixture of the acidic component and the oxidizing agent, the water soluble compounds are separated from the platinum. When the acid that is used is dilute enough all of the soluble compounds may already be in solution. When the acid is used in a concentrated form, however, the salt of the acid, for example, aluminum sulfate may be present as a cake and additional water is necessary to form a solution of the soluble compounds. In any event platinum is separated from a solution of the soluble compounds in any suitable manner such as filtering, decantation, centrifugal separation, etc. Preferably the material is filtered under suitable pressure or vacuum filtering means. In some cases the filtrate may contain a fine precipitate in which case the first filtrate may be refiltered through the filtering means after a layer of filter-cake has been built up in the recovery apparatus.

The recovered filter cake is subjected to thorough washing with distilled water to remove substantially all of the soluble compounds and to provide a resulting material which is substantially pure platinum. Carbon that is present with the catalyst may also be present with the platinum on the filter cake.

The used catalysts, such as used platinum-alumina catalyst, generally will contain carbonaceous deposits formed during the hydrocarbon conversion reaction. In accordance with the present invention, the carbonaceous deposits may be removed, either before or after the digesting treatment, by burning in the presence of air or an oxygen-containing gas at a temperature of from about 700° F. to about 1600° F. or more, although sustained temperatures above 1600° F. are not recommended. In a particularly preferred method, the spent catalyst is subjected to oxidation at a temperature of from about 1200° F. to about 1550° F. for a period of from about 0.1 to about 8 hours before the composite is subjected to digestion. This treatment has been found to be of advantage in the final recovery of the platinum during the subsequent filtration and/or centrifugal separation.

In some cases it is preferred to screen the spent catalyst in order to remove foreign material which may become mixed with the catalyst during processing or removal from the reactors of the hydrocarbon conversion process. In such cases, the catalyst preferably is shaken and screened in order to remove the fine powder. In other cases, the catalyst may become contaminated with the over-size material as, for example, larger size particles which are disposed as a supporting layer beneath the catalyst in the reactor, and the catalyst should be screened to remove these larger size particles. It is understood that the process of the present invention may be used on the fines or screenings since these fines will contain noble metal-containing catalyst particles as well as iron sulfide, carbon, inert metal sulfide, etc.

It is understood further that the noble metal in the catalyst may be present in any suitable form including a chemical compound, loose complex or physical association with one or more of the other components of the composite. However, reference to the noble metal or platinum in the present specification and claims is intended to include the same in any form in which it is present. Thus, reference to a noble metal-containing composite or a platinum-containing composite is understood to mean that the noble metal or platinum may be present in any of the forms as hereinbefore set forth.

The following example is introduced to illustrate further the novelty and utility of the present invention but not with the intention of unduly limiting the same.

EXAMPLE

A catalyst containing platinum and alumina was removed from a reaction chamber after the catalyst was used for an extended period of time for the reforming of a naphtha to produce high octane gasoline. The catalyst was screened and the fines from the screening operation were collected. The fines contained broken catalyst particles, iron sulfide, carbon, chromium sulfide, etc. The fines were analyzed as containing about 0.1% by weight of platinum. 20 grams of these catalyst fines were burned in air in a muffle furnace at 1112° F. for about three hours. The fines were then removed, cooled and 75 cc. of distilled water added and the mixture placed in a 450 ml. Pyrex liner of an autoclave. 60 grams of commercial concentrated sulfuric acid were then added and the mixture heated to near the boiling point for about 15 minutes. Water was then added in amount to make up for the water evaporated on heating and then 25 cc. more of distilled water added. This mixture was then place in a pressure autoclave, sealed and heated at 329° F. for about five hours. The autoclave was then allowed to cool, and the precipitate was separated by filtering, and the precipitate was thoroughly washed with distilled water. The precipitate was then dried and analyzed for sulfur and was found to contain 2.3% by weight of sulfur, mostly in the form of inert metal sulfides, such as chromium sulfide.

The experiment was repeated several times, however, an oxidizing agent was added along with the 25 cc. of distilled water that was added after the heating with sulfuric acid, but before placing the mixture in the pressure autoclave or bomb. Various oxidizing agents were used and the amounts varied. The amounts are listed below in Table I. The amounts are the weight percent of the oxidizing agent based upon the weight of fines after the burning operation. After using an oxidizing agent, the precipitate, after washing and drying, was analyzed for sulfur content. The results are tabulated below in Table I.

Table I.—Effect of oxidizing agents upon sulfide reduction

| Reagent | Amount, percent | Sulfur remaining, wt. percent |
| --- | --- | --- |
| None | | 2.3 |
| Potassium dichromate | 0.5 | 0.69 |
| Potassium persulfate | 1.0 | 0.36 |
| Hydrogen peroxide | 5 | 0.32 |
| Potassium chlorate | 1.0 | 0.24 |
| Perchloric acid | 0.75 | 0.17 |

The above results clearly show that the presence of an oxidizing agent during the digestion step produced a platinum precipitate which had a much lower sulfur content. Other concentrations of these oxidizing agents as well as other oxidizing agents as hereinbefore mentioned may be used to effect the reduction of sulfur by oxidation of the inert metal sulfides to form soluble sulfates which are removed in the digestion and washing of the precipitate.

I claim as my invention:

1. A method of recovering a noble metal from a composite thereof with a refractory inorganic oxide and a metal sulfide non-reactive with mineral acid, which comprises digesting said composite with a strong mineral acid of lesser oxidizing activity than nitric acid and, in addition to said acid, an oxidizing agent which is substantially free of combined nitrogen, whereby to convert said sulfide to sulfate and to dissolve the later and the inorganic oxide, and separating the resultant solution from the undissolved noble metal.

2. A method of recovering platinum from a composite thereof with a refractory inorganic oxide and a metal sulfide non-reactive with mineral acid, which comprises digesting said composite with a strong mineral acid of lesser oxidizing activity than nitric acid and, in addition to said acid, an oxidizing agent which is substantially free of combined nitrogen, whereby to convert said sulfide to sulfate and to dissolve the latter and the inorganic oxide, and separating the resultant solution from the undissolved platinum.

3. A method of recovering platinum from a used alumina base catalyst containing platinum and a metal sulfide non-reactive with mineral acid, which comprises digesting said catalyst with a strong mineral acid of lesser oxidizing activity than nitric acid and, in addition to said acid, an oxidizing agent which is substantially free of combined nitrogen, whereby to convert said sulfide to sulfate and to dissolve the latter and the alumina, and separating the resultant solution from the undissolved platinum.

4. A method of recovering platinum from a used alumina base catalyst containing platinum and chromium sulfide, which comprises digesting said catalyst with sulfuric acid and, in addition to said acid, an oxidizing agent which is substantially free of combined nitrogen, whereby to convert said sulfide to sulfate and to dissolve the latter and the alumina, and separating the resultant solution from the undissolved platinum.

5. The method of claim 3 further characterized in that said strong acid is selected from the group consisting of sulfuric, hydrochloric, hydrofluoric, chlorosulfonic, and fluorosulfonic acids.

6. The method of claim 3 further characterized in that said oxidizing agent is selected from the group consisting of perchloric, hypochlorous and chloric acids, hydrogen peroxide, and sodium and potassium persulfates, dichromates and permanganates.

7. The method of claim 4 further characterized in that said oxidizing agent comprises perchloric acid.

8. The method of claim 4 further characterized in that said oxidizing agent comprises hypochlorous acid.

9. The method of claim 4 further characterized in that said oxidizing agent comprises chloric acid.

10. The method of claim 4 further characterized in that said oxidizing agent comprises hydrogen peroxide.

11. The method of claim 4 further characterized in that said oxidizing agent comprises air.

References Cited in the file of this patent

FOREIGN PATENTS 289,220    Great Britain _____ Apr. 26, 1928

OTHER REFERENCES

Thorpe's Dictionary of Applied Chemistry, 4th edition, vol. I, page 283.

Comprehensive Treatise of Organic and Theoretical Chemistry, vol. 16, page 156. Edited by Mellor.